United States Patent
Noya et al.

(10) Patent No.: US 7,527,898 B2
(45) Date of Patent: May 5, 2009

(54) METHOD OF PRODUCING GEL NEGATIVE ELECTRODE FOR ALKALINE BATTERY AND APPARATUS FOR PRODUCING THE SAME

(75) Inventors: Shigeto Noya, Neyagawa (JP); Yasuo Mukai, Moriguchi (JP); Kenji Shiotani, Takarazuka (JP); Hideki Misaki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/007,300

(22) Filed: Jan. 9, 2008

(65) Prior Publication Data

US 2008/0117716 A1     May 22, 2008

Related U.S. Application Data

(62) Division of application No. 10/489,713, filed as application No. PCT/JP02/09183 on Sep. 9, 2002, now Pat. No. 7,332,000.

(30) Foreign Application Priority Data

Sep. 17, 2001   (JP) .............................. 2001-282079
Aug. 6, 2002    (JP) .............................. 2002-228800

(51) Int. Cl.
*H01M 6/00*    (2006.01)
*B01F 9/00*    (2006.01)

(52) U.S. Cl. ..................... 429/300; 29/623.1; 366/55; 366/219

(58) Field of Classification Search ............. 366/53–59, 366/62, 63, 219–220, 233, 237–239; 429/300; 29/623.1
See application file for complete search history.

(56) References Cited

U.S. PATENT DOCUMENTS

| | | | | |
|---|---|---|---|---|
| 3,645,834 A | | 2/1972 | McCaffrey et al. | |
| 3,981,488 A | * | 9/1976 | Ratowsky | .................... 366/219 |
| 4,277,185 A | * | 7/1981 | Thompson | .................. 366/213 |
| 4,296,072 A | | 10/1981 | Takacs et al. | |
| 4,521,116 A | * | 6/1985 | Adsit | .......................... 366/54 |
| 4,789,446 A | | 12/1988 | Von Roepenack et al. | |
| 4,877,327 A | * | 10/1989 | Whiteman, Jr. | .............. 366/46 |
| RE34,505 E | * | 1/1994 | Whiteman, Jr. | .............. 366/46 |
| 5,302,017 A | * | 4/1994 | Platek et al. | .................. 366/57 |
| 5,884,999 A | * | 3/1999 | Muzzio et al. | .............. 366/219 |
| 5,938,330 A | * | 8/1999 | Robinson et al. | ............ 366/224 |
| 6,464,386 B1 | * | 10/2002 | Oota et al. | ................... 366/239 |

(Continued)

FOREIGN PATENT DOCUMENTS

GB          709003      *   5/1954

(Continued)

*Primary Examiner*—Charles E Cooley
(74) *Attorney, Agent, or Firm*—McDermott Will & Emery LLP (57) ABSTRACT

In order to provide a method of producing a gel negative electrode for an alkaline battery for preparing a gel negative electrode in which a zinc powder, a gelling agent and an electrolyte are disposed uniformly, by an agitator including a cylindrical agitation container disposed so that the center axis X of the cylinder is parallel to the horizontal direction, the agitation container is rotated around the center axis X and the left and right portions of the agitation container are swung around an axis Y, which is orthogonal to the longitudinal direction of the agitation container, thereby agitating and mixing the alkaline electrolyte and the dry mixture.

3 Claims, 4 Drawing Sheets

U.S. PATENT DOCUMENTS 7,332,000 B2 * 2/2007 Noya et al. ................ 29/623.1

FOREIGN PATENT DOCUMENTS

| JP | 5-151958 A | 6/1993 |
| JP | 06296847 A * | 10/1994 |
| JP | 10-208754 * | 8/1998 |
| JP | 2000-030695 | 1/2000 |
| JP | 2002-025545 | 1/2002 |

* cited by examiner

METHOD OF PRODUCING GEL NEGATIVE ELECTRODE FOR ALKALINE BATTERY AND APPARATUS FOR PRODUCING THE SAME

RELATED APPLICATIONS

This application is a Divisional of U.S. application Ser. No. 10/489,713, filed on Mar. 15, 2004, now U.S. Pat. No. 7,332, 000, which is a U.S. National Phase under 35 U.S.C. § 371 of International Application No. PCT/JP02/09183, filed on Sep. 9, 2002, claiming priority of Japanese Application No. 2001-282079, filed on Sep. 17, 2001 and Japanese Application No. 2002-228800, filed on Aug. 6, 2002, the entire contents of each of which are hereby incorporated by reference.

TECHNICAL FIELD

The present invention relates to a method of producing a gel negative electrode for use in an alkaline battery and to an alkaline battery comprising the gel negative electrode obtained by the above-mentioned production method.

BACKGROUND ART

As methods of producing gel negative electrodes for conventional alkaline batteries, a method wherein a gelling agent is first dispersed uniformly in an electrolyte to obtain a gel electrolyte and then the gel electrolyte is mixed with a zinc powder by agitation (the wet mixing method), and a method wherein a zinc powder is first mixed with a gelling agent to obtain a dry powder mixture and then the dry mixture is mixed with an electrolyte by agitation (the dry mixing method) are known (for example, Japanese Laid-open Patent Application No. Hei 10-208754 and Japanese Laid-open Patent Application No. 2000-30695).

In the above-mentioned dry mixing method, a V-shaped agitator and a pot mill, for example, are used; however, there is a problem that the zinc powder agglutinates, and the zinc powder and the gelling agent also agglutinate during agitation and mixing, whereby a uniform gel negative electrode cannot be obtained. Furthermore, there is a problem that the discharge characteristic of an alkaline battery using the gel negative electrode produced in this way has a wide range of variation.

On the other hand, in the above-mentioned wet mixing method, there is a problem that a long time is necessary for uniform dispersion and mixing when preparing the gel electrolyte, and the gelling agent is liable to become lumpy during mixing. These problems were unable to be solved sufficiently even when any types of agitators were used.

Accordingly, an object of the present invention is to overcome the above-mentioned problems and provide a method of producing a gel negative electrode for an alkaline battery, the method being able to prepare a gel negative electrode in which a zinc powder, a gelling agent and an electrolyte are dispersed uniformly. Furthermore, another object of the present invention is to provide an alkaline battery excellent in discharge characteristic by using the gel negative electrode obtained by the above-mentioned production method.

DISCLOSURE OF INVENTION

The present invention relates to a method of producing a gel negative electrode for an alkaline battery by agitating and mixing an alkaline electrolyte with a dry mixture, which is obtained by uniformly mixing a zinc powder and a gelling agent, said method comprising the steps of:

providing an agitator comprising a cylindrical agitation container disposed so that the center axis X of a cylinder is parallel to the horizontal direction, and rotating the agitation container around the center axis X while swinging the left and right portions of the agitation container around an axis Y, which is orthogonal to the longitudinal direction of the agitation container, thereby agitating and mixing the alkaline electrolyte and the dry mixture to obtain the gel negative electrode.

It is effective that the zinc powder contains 60 to 80% by weight of zinc particles having a particle size of more than 75 μm and not more than 425 μm and 20 to 40% by weight of zinc particles having a particle size of not more than 75 μm.

In addition, it is effective that the agitator is a rocking mixer.

Furthermore, it is effective that the center axis Y does not intersect the center axis X and is positioned under the center axis X.

Moreover, it is effective that the agitation container has an agitation blade on the inner surface thereof.

Still further, it is effective that the agitation container has a fluorocarbon resin film on the inner surface thereof.

Still further, the present invention also relates to an alkaline battery having the gel negative electrode obtained by the above-mentioned production method.

Still further, the present invention relates to an apparatus for producing a gel negative electrode for an alkaline battery by agitating and mixing an alkaline electrolyte with a dry mixture obtained by uniformly mixing a zinc powder and a gelling agent, the apparatus comprising a cylindrical agitation container disposed so that the center axis X of a cylinder is parallel to the horizontal direction, the agitation container being capable of rotating around the center axis X and the left and right portions of the agitation container being capable of swinging around an axis Y, which is orthogonal to the longitudinal direction of the agitation container, thereby agitating and mixing the alkaline electrolyte and dry mixture to give a gel negative electrode.

BEST MODE FOR CARRYING OUT THE INVENTION

The method of producing a gel negative electrode for an alkaline battery in accordance with the present invention is a method of producing a gel negative electrode for an alkaline battery by agitating and mixing an alkaline electrolyte with a dry mixture, which is obtained by uniformly mixing a zinc powder and a gelling agent, the method comprising the steps of:

providing an agitator comprising a cylindrical agitation container disposed so that the center axis X of the cylinder becomes parallel to the horizontal direction, and rotating the agitation container around the center axis X while swinging the left and right portions of the agitation container around an axis Y, which is orthogonal to the longitudinal direction of the agitation container, thereby agitating and mixing the alkaline electrolyte and dry mixture to obtain a gel negative electrode.

Just as in the case of the conventional dry mixing method, the alkaline electrolyte and the dry mixture that is obtained by uniformly mixing the zinc powder and the gelling agent are first prepared, separately.

Conventional materials can be used as the alkaline electrolyte, zinc powder and gelling agent that are used at this time; as to the zinc powder in particular, it is preferable to use a specific zinc powder containing 60 to 80% by weight of zinc particles having a particle size of more than 75 μm and not more than 425 μm and 20 to 40% by weight of zinc particles having a particle size of not more than 75 μm.

A zinc powder having been used conventionally contains 100 to 85% by weight of zinc particles having a particle size of more than 75 μm and not more than 425 μm and 0 to 15% by weight of zinc particles having a particle size of not more than 75 μm. Even when this kind of conventional zinc powder is used, a gel negative electrode having an excellent dispersion state can be obtained by the present invention; however, the inventors of the present invention have found that a gel negative electrode having a particularly excellent dispersion state can be obtained when the above-mentioned specific zinc powder is used.

Furthermore, in the present invention, an agitator having a cylindrical agitation container is used as an agitator and the cylindrical agitation container is disposed so that the center axis X thereof becomes parallel to the horizontal direction. A rocking mixer can be used as this kind of agitator.

In first, the electrolyte is charged into this cylindrical agitation container and then the dry mixture is charged. However, the dry mixture may be charged into the container beforehand and then the electrolyte may be charged. The former method is preferable from the viewpoint of allowing the electrolyte and the dry mixture to be compatible to each other and preventing an aggregate from generating.

Figure 1:
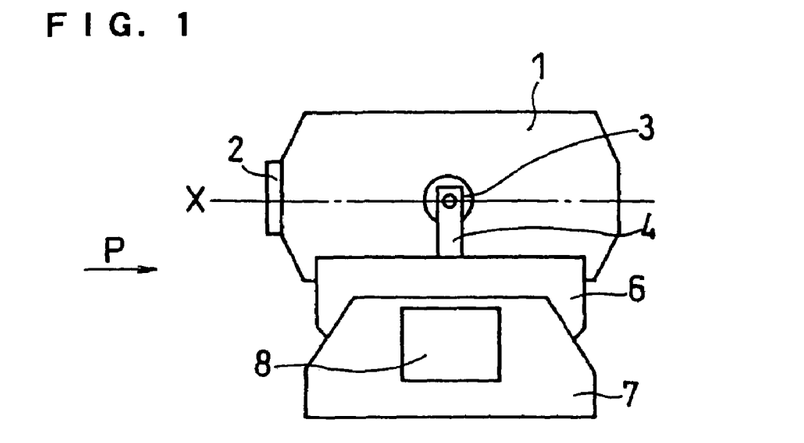
FIG. 1 is a front view schematically showing a rocking mixer serving as an agitator comprising a cylindrical agitation container for use in the present invention.
Figure 2:
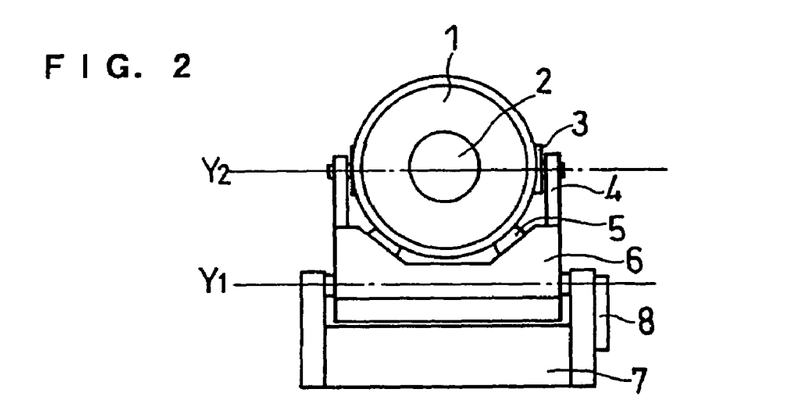
FIG. 2 is a side view of the agitator shown in FIG. 1, viewed from the direction of an arrow P.

Next, the dry mixture is mixed with the electrolyte by agitation. Herein, FIG. 1 is a front view schematically showing a rocking mixer serving as an agitator comprising a cylindrical agitation container for use in the present invention. In addition, FIG. 2 is a side view of the agitator shown in FIG. 1, viewed from the direction of an arrow P.

The agitator shown in FIG. 1 comprises an anchor block 7, a swinging block 6 disposed thereon, and a cylindrical agitation container 1. Furthermore, a control board 8 is disposed on the anchor block 7. The cylindrical agitation container 1 has a material supply port 2 and rotates around a center axis X. This rotation is carried out by rotation rollers 5, which is disposed between the swinging block 6 and the cylindrical agitation container 1 as shown in FIG. 2.

In addition, the cylindrical agitation container 1 can be swung up and down or from side to side around an axis $Y_1$, which extends perpendicularly to the center axis X and positioned under the center axis X, or around an axis $Y_2$, which is orthogonal to and intersects the center axis X and positioned at the center of the cylindrical agitation container 1 in the longitudinal direction thereof. As shown in FIGS. 1 and 2, the position of the axis $Y_1$ is determined by the swinging block 6 and the anchor block 7, and the position of the axis $Y_2$ is determined by swinging arms 4. Furthermore, swinging rollers 3 are disposed between the swinging arms 4 and the cylindrical agitation container 1 to smoothly carry out the swinging.

Since the swinging width of the cylindrical agitation container 1 is larger and the agitating and mixing state of the content is better to give a uniform dispersion of the content, the axis $Y_1$ is preferable to the axis $Y_2$.

By using the above-mentioned apparatus, the cylindrical agitation container 1 can be rotated around the center axis X, and the left and right portions of the cylindrical agitation container 1 can be swung around the axis Y, whereby the alkaline electrolyte and the dry mixture can be agitated, mixed and dispersed uniformly to obtain an excellent gel negative electrode.

In an ordinary V-shaped agitator and an ordinary pot mill, only the same rotation as that around the above-mentioned center axis X can be carried out; however, in the rocking mixer for use in the present invention, the dry mixture and the electrolyte can be diffused and mixed with each other by the rotation around the center axis X similar to the rotation of the V-shaped agitator and the pot mill and, further, the dry mixture and the electrolyte can be moved from side to side inside the cylindrical agitation container 1 and mixed with each other by the swinging around the axis Y, whereby it is possible to efficiently obtain a gel negative electrode having a more uniform dispersion state.

Figure 3:
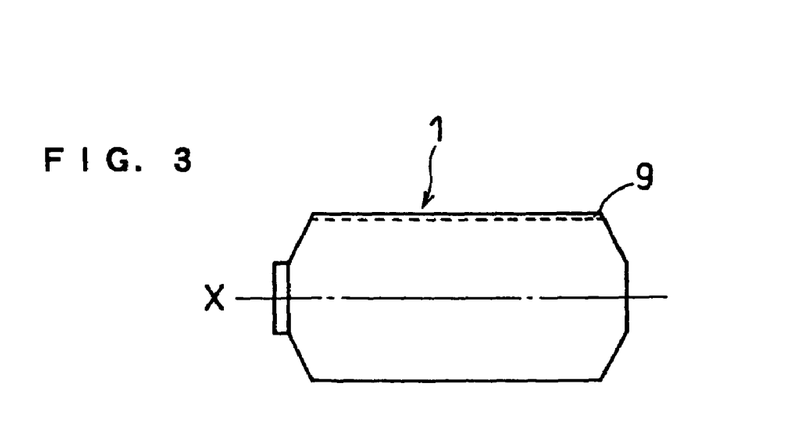
FIG. 3 is a front view of the cylindrical agitation container for use in the rocking mixer shown in FIGS. 1 and 2.

Furthermore, FIG. 3 is a front view of the cylindrical agitation container 1. It is effective that the cylindrical agitation container 1 has an agitation blade 9, which extends in the longitudinal direction of the cylindrical agitation container 1, on the inner surface thereof as indicated by a dotted line in FIG. 3. By using this agitation vane 9, it is possible to obtain a gel negative electrode having an excellent dispersion state.

Moreover, it is preferable that a fluorocarbon resin film or the like is provided on the inner surface of the cylindrical agitation container 1 to prevent the zinc powder from corrosion and to facilitate the removal of the obtained gel negative electrode. Various types of fluorocarbon resins can be used; for example, polyethylene fluoride resin (TEFLON made by E. I. du Pont, U.S.A., or the like) can be used.

The rate of the rotation of the cylindrical agitation container 1 around the center axis X may be 8 to 30 rpm for the reason that the mixing-agitating effect by the raking of the agitation blade can exhibit effectively. The rate of 12 to 20 rpm is preferable, in particular.

Furthermore, the angle of the swinging around the axis $Y_1$ or $Y_2$, that is, the tilt angle of the axis X of the cylindrical agitation container 1 with respect to the horizontal direction may be 10 to 35 degrees for the reason that the mixing space inside the container can be effectively used. The angle of 15 to 25 degrees is preferable, in particular.

Moreover, the number of swinging times may be 3 to 20 times/minute for the reason that the kneading effect can be enhanced to facilitate the swelling of the gelling agent. The number of 5 to 12 times/minute is preferable, in particular.

Next, FIGS. 4 to 8 show the swinging states of the cylindrical agitation container 1 having the axis $Y_1$ and $Y_2$.

Figure 4:
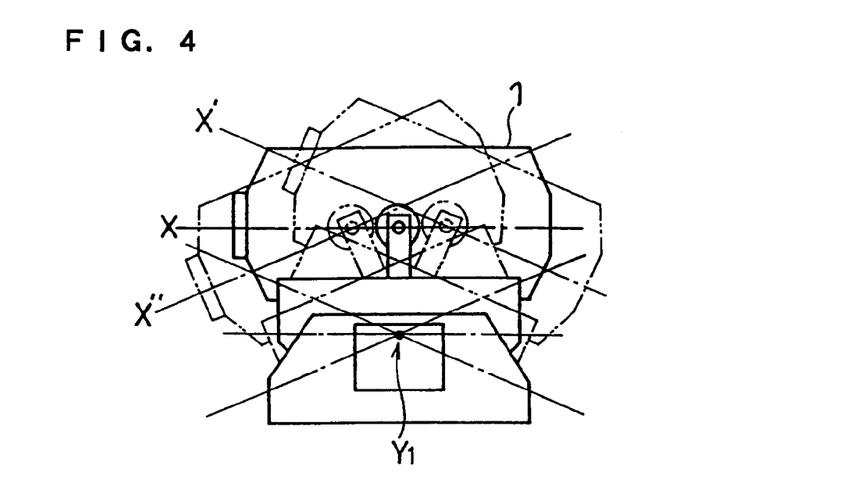
FIG. 4 is a view showing a state wherein the cylindrical agitation container 1 having the axis $Y_1$, which extends perpendicularly to the center axis X and is positioned under the center axis X, is swinging around the axis $Y_1$.

FIG. 4 is a view showing a state wherein the cylindrical agitation container 1 having the axis $Y_1$, which extends perpendicularly to the center axis X and positioned under the center axis X, is swinging around the axis $Y_1$.

Figure 5:
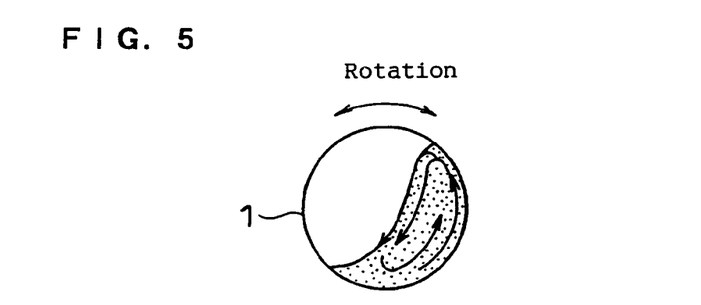
FIG. 5 is a view schematically showing the movement state of the content due to the rotation of the cylindrical agitation container 1 around the axis X (including X' and X'').
Figure 6:
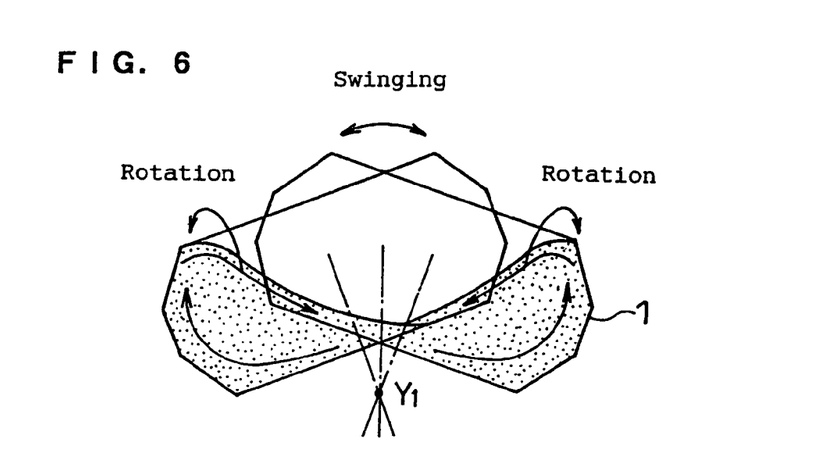
FIG. 6 is a view schematically showing the movement state of the content due to the swinging of the cylindrical agitation container 1 around the axis $Y_1$.

The movement states of the content at this time are shown in FIGS. 5 and 6. FIG. 5 is a view schematically showing the movement state of the content due to the rotation of the cylindrical agitation container 1 around the axis X (including X' and X"). In addition, FIG. 6 is a view schematically showing the movement state of the content due to the swinging of the cylindrical agitation container 1 around the axis $Y_1$.

Figure 7:
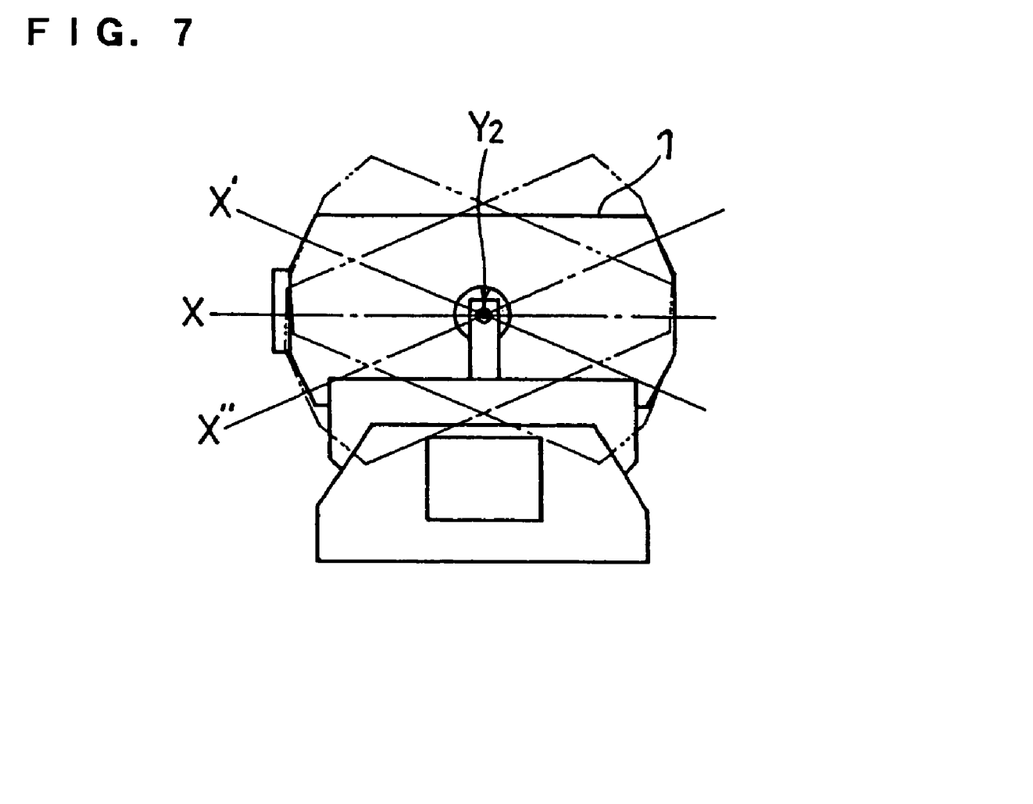
FIG. 7 is a view showing a state wherein the cylindrical agitation container 1 having the axis $Y_2$, which is orthogonal to the center axis X and positioned at the center of the cylindrical agitation container 1 in the longitudinal direction thereof, is swinging around the axis $Y_2$.

On the other hand, FIG. 7 is a view showing a state wherein the cylindrical agitation container 1 having the axis $Y_2$, which is orthogonal to the center axis X and positioned at the center of the cylindrical agitation container 1 in the longitudinal direction thereof, is swinging around the axis $Y_2$.

Figure 8:
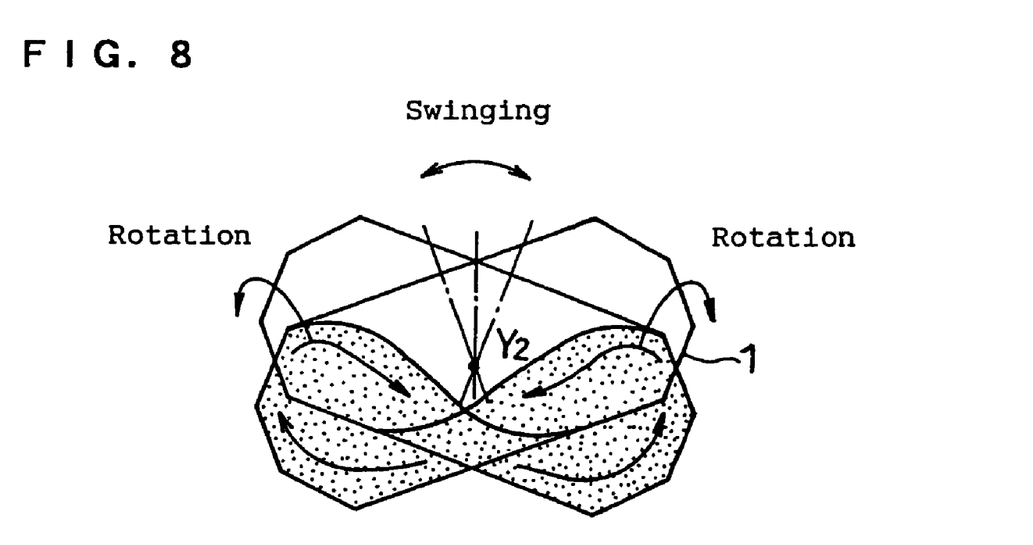
FIG. 8 is a view schematically showing the movement state of the content due to the swinging of the cylindrical agitation container 1 around the axis $Y_2$.

The movement state of the content at this time is shown in FIG. 8. FIG. 8 is a view schematically showing the movement state of the content due to the swinging of the cylindrical agitation container 1 around the axis $Y_2$. The movement state of the content due to the rotation of the container around the axis X is the same as that shown in FIG. 5.

The present invention will be described more specifically by using examples; however, the present invention is not limited to only these examples.

EXAMPLE 1

In this example, to 100 parts by weight of a specific zinc powder containing 70% by weight of zinc particles having a particle size of more than 75 μm and not more than 425 μm and 30% by weight of zinc particles having a particle size of not more than 75 μm, 2 parts by weight of a polyacrylic acid serving as a gelling agent was added and mixed to obtain a dry mixture.

The dry mixture was charged into the cylindrical agitation container 1 having the agitation blade 9 shown in FIGS. 1 to 3 and, then, 35 parts by weight of an alkaline electrolyte (40 weight % of an aqueous KOH solution) was charged per 65 parts by weight of the dry mixture.

By means of a rocking mixer (RM-30HD made by AICHI DENKI KABUSHIKI KAISYA) serving as an agitator having the axis $Y_1$ shown in FIG. 1, the cylindrical agitation container 1 was swung (at a tilt angle of 40 degrees and at a swinging speed of 12 swings/minute) while being rotated for one hour (at a rotation rate of 15 rpm), whereby the dry mixture and the electrolyte are agitated and mixed to obtain a gel negative electrode.

[Evaluation]

The characteristic of the gel negative electrode produced as described above and the characteristic of an alkaline battery using the above gel negative electrode were evaluated in the manner described below.

(1) Characteristic of Gel Negative Electrode

The obtained gel negative electrode was sieved by using a sieve, which had openings of 4 mm and was made of Nylon of 1 mm in diameter, and the amount of aggregate not mixed uniformly but remaining on the sieve was measured. In addition, the yield, viscosity and density of the gel negative electrode uniformly mixed after the sieving were measured. The results were shown in Table 1.

(2) Characteristic of Battery with the Gel Negative Electrode

Figure 9:
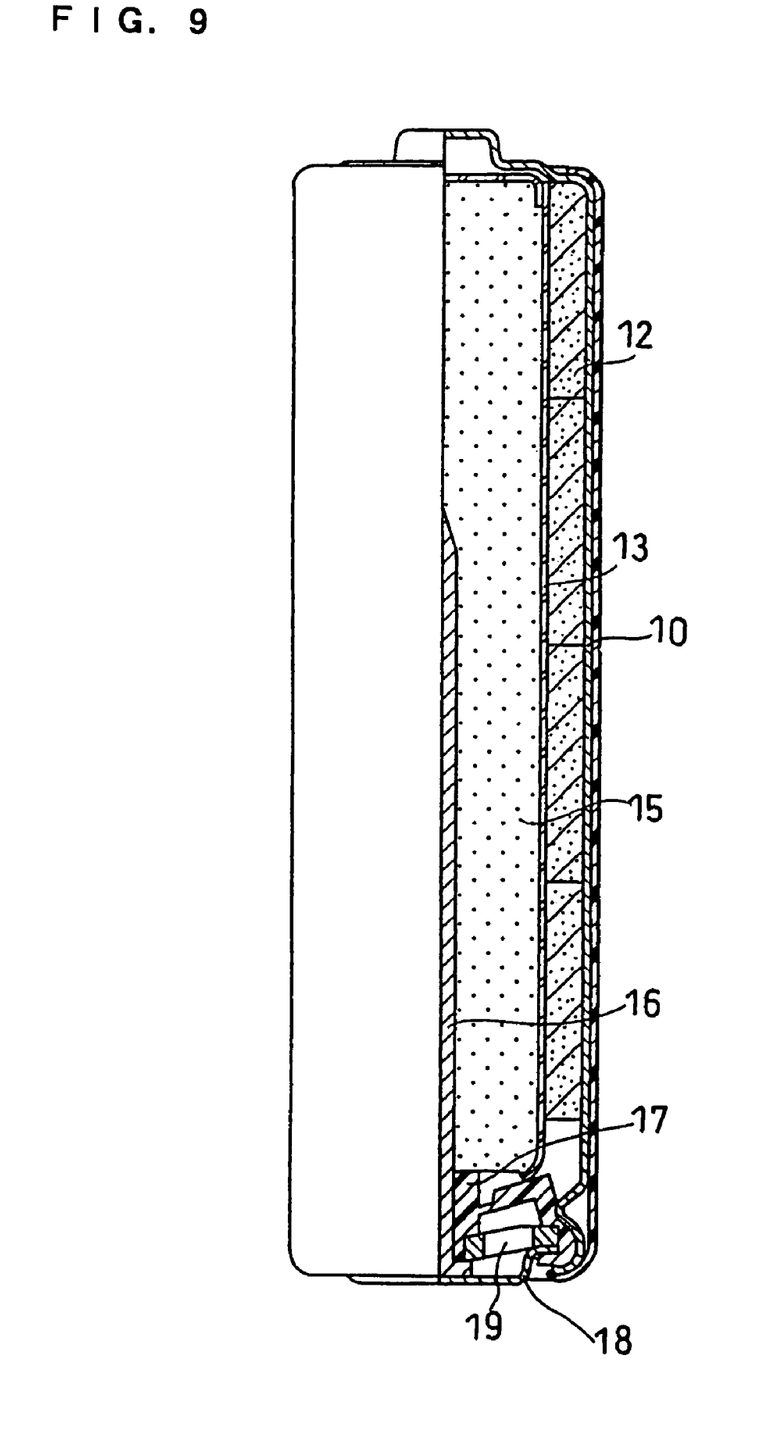
FIG. 9 is a partially-cutaway front view of the alkaline battery in accordance with an example of the present invention.

Furthermore, an AA-size alkaline battery shown in FIG. 9 was assembled by using the obtained gel negative electrode. FIG. 9 is a partially-cutaway front view of the alkaline battery produced in accordance with this example.

In the alkaline battery shown in FIG. 9, a graphite coating film (not shown) was formed on the inner surface of a positive electrode case 10 made of a nickel-plated steel. The interior of the positive electrode case 10 was filled with a plurality of shortly cylindrical shaped positive electrode mixture pellets 12 comprising manganese dioxide as a main component. In addition, a gel negative electrode 15 was charged into the inside of the positive electrode mixture pellets 12 with a separator 13 disposed therebetween. A negative electrode current collector 16 was integrated with a resin sealing member 17, a bottom plate 18 also serving as a negative electrode terminal, and an insulating washer 19. In addition, the opening end portion of the positive electrode case 10 was fixed to the peripheral portion of the bottom plate 18 via the end portion of the resin sealing member 17.

The battery obtained as described above was discharged continuously at a constant current of 1500 mA at 20° C., and the discharge duration time to a terminal voltage of 0.9 V was measured.

EXAMPLE 2

A gel negative electrode was produced in the same manner as in EXAMPLE 1, except that no agitation blade was provided for the cylindrical agitation container 1, and a similar evaluation was carried out. The results were shown in Table 1. The values of viscosity index and discharge time were represented by indexes by using the results of EXAMPLE 1 as 100.

EXAMPLE 3

A gel negative electrode was produced in the same manner as in EXAMPLE 1, except that a specific zinc powder containing 85% by weight of zinc particles having a particle size of more than 75 μm and not more than 425 μm and 15% by weight of zinc particles having a particle size of not more than 75 μm was used, and a similar evaluation was carried out. The results were shown in Table 1.

COMPARATIVE EXAMPLE 1

A gel negative electrode was produced in the same manner as in EXAMPLE 1, except that the cylindrical agitation container 1 was not swung but tilted 20 degrees with respect to the horizontal direction and rotated around the center axis X, and a similar evaluation was carried out. The results were shown in Table 1.

COMPARATIVE EXAMPLE 2

A gel negative electrode was produced in the same manner as in EXAMPLE 1, except that the cylindrical agitation container 1 was not swung but maintained in the horizontal direction and rotated around the center axis X, and a similar evaluation was carried out. The results were shown in Table 1.

COMPARATIVE EXAMPLE 3

A gel negative electrode was produced in the same manner as in EXAMPLE 1, except that the cylindrical agitation container 1 with no agitation blade was used and that the cylindrical agitation container 1 was not swung but maintained in the horizontal direction and rotated around the center axis X, and a similar evaluation was carried out. The results were shown in Table 1.

This agitating and mixing operation is similar to the agitating and mixing operation by a pot mil with no balls.

COMPARATIVE EXAMPLE 4

A gel negative electrode was produced in the same manner as in EXAMPLE 1, except that a V-shaped agitator was used as an agitator, and a similar evaluation was carried out. The results were shown in Table 1.

COMPARATIVE EXAMPLE 5

A gel negative electrode was produced in the same manner as in EXAMPLE 3, except that the cylindrical agitation container 1 was not swung but tilted 20 degrees with respect to the horizontal direction and rotated around the center axis X, and a similar evaluation was carried out. The results were shown in Table 1.

TABLE 1

| | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| Agitator | Rocking mixer | Rocking mixer | Rocking mixer | Rocking mixer | Rocking mixer | Rocking mixer | V-shaped agitator | Rocking mixer |
| Agitating method | Swing/rotation | Swing/rotation | Swing/rotation | Tilt/rotation | Horizontal/rotation | Horizontal/rotation | — | Tilt/rotation |
| Use of Blade | Yes | No | Yes | Yes | Yes | No | — | Yes |
| Amount of aggregate (%) | 0.1 | 2.1 | Not more than 0.1 | 4.3 | 6.5 | 12.0 | 8.7 | 1.6 |
| Yield of negative electrode (%) | 97 | 94 | 98 | 91 | 88 | 70 | 73 | 93 |
| Viscosity index | 100 | 90 | 90 | 85 | 85 | 85 | 95 | 80 |
| Density (g/cc) | 2.92 | 2.90 | 2.93 | 2.89 | 2.89 | 2.84 | 2.85 | 2.91 |
| Discharge time | 100 | 97 | 95 | 94 | 95 | 90 | 93 | 92 |
| Discharge variation | 1.7 | 1.7 | 1.3 | 2.1 | 2.0 | 2.4 | 2.3 | 1.6 |

Table 1 indicates the amount of the aggregate, the yield, viscosity and density of the gel negative electrode, the discharge duration time and discharge variation of the obtained battery in each of EXAMPLES 1 to 3 and COMPARATIVE EXAMPLES 1 to 5. However, the value of the viscosity of the gel negative electrode was represented by an index by using the viscosity of EXAMPLE 1 as 100; furthermore, the values of the discharge duration time and discharge variation were each calculated from the average of 10 batteries, and the value of the discharge duration time was represented by an index by using the discharge duration time of EXAMPLE 1 as 100.

As clearly indicated in Table 1, it is understood that the occurrence of the aggregate is less and the gel negative electrode having a higher and more uniform negative electrode density is obtained, when the gel negative electrode is produced by the rotation and swinging of the rocking mixer and the cylindrical agitation container for agitation is provided with the agitation blade. In addition, it is found that the discharge duration time of the alkaline battery in accordance with EXAMPLE 1 of the present invention is the longest, and that the discharge variation thereof is small.

Moreover, if the amount of the zinc particles having a particle size of not more than 75 μm is more than 40% by weight, the yield of the negative electrode is less than 90%; this is not practical. Still further, if the amount of the zinc particles having a particle size of not more than 75 μm is less than 20% by weight, an improvement is recognized in comparison with the conventional method; however, the yield of the negative electrode is not improved sufficiently even when the method in accordance with the present invention is used.

INDUSTRIAL APPLICABILITY

As described above, in accordance with the present invention, a gel negative electrode having a uniform dispersion state can be produced, whereby it is possible to obtain a high-performance alkaline battery.

The invention claimed is:

1. An alkaline battery having the gel negative electrode, which is obtained by the production method comprising the steps of:
   providing an agitator comprising a cylindrical agitation container disposed so that the center axis X of the cylinder is parallel to the horizontal direction, and
   rotating said agitation container around the center axis X while swinging the left and right portions of said agitation container around an axis Y, which is orthogonal to the longitudinal direction of said agitation container, thereby agitating and mixing an alkaline electrolyte and dry mixture to obtain said gel negative electrode,
   wherein the amount of aggregate of the gel negative electrode is not more than 2.1%.

2. The alkaline battery of claim 1, wherein the amount of aggregate of the gel negative electrode is not more than 0.1%.

3. The alkaline battery of claim 1, wherein the agitation container has an agitation blade on an inner surface thereof.

* * * * *